United States Patent
Hilgers et al.

(10) Patent No.: US 9,810,597 B2
(45) Date of Patent: Nov. 7, 2017

(54) SNIFFER LEAK DETECTOR WITH MULTI-STAGE MEMBRANE PUMP

(71) Applicant: Inficon GmbH, Cologne (DE)

(72) Inventors: Heike Hilgers, Bergisch Gladbach (DE); Hjalmar Bruhns, Bonn (DE); Daniel Wetzig, Cologne (DE); Norbert Rolff, Kerpen (DE)

(73) Assignee: Inficon GmbH, Cologne (DE)

( * ) Notice: Subject to any disclaimer, the term of this patent is extended or adjusted under 35 U.S.C. 154(b) by 89 days.

(21) Appl. No.: 15/021,054

(22) PCT Filed: Sep. 2, 2014

(86) PCT No.: PCT/EP2014/068582
§ 371 (c)(1),
(2) Date: Mar. 10, 2016

(87) PCT Pub. No.: WO2015/036282
PCT Pub. Date: Mar. 19, 2015

(65) Prior Publication Data
US 2016/0223424 A1  Aug. 4, 2016

(30) Foreign Application Priority Data
Sep. 16, 2013 (DE) .......... 10 2013 218 506

(51) Int. Cl.
*F04D 19/04* (2006.01)
*G01M 3/20* (2006.01)
*G01L 19/06* (2006.01)

(52) U.S. Cl.
CPC ......... *G01M 3/205* (2013.01); *G01L 19/0654* (2013.01); *F04D 19/046* (2013.01)

(58) Field of Classification Search
CPC ...... F04D 19/04; F04D 19/046; G01M 3/202; G01M 3/205
See application file for complete search history.

(56) References Cited

U.S. PATENT DOCUMENTS 3,690,151 A * 9/1972 Briggs ............... H01J 49/0495
                                                  73/40.7
4,735,084 A * 4/1988 Fruzzetti ............ G01M 3/202
                                                  73/40.7

(Continued)

FOREIGN PATENT DOCUMENTS

DE          3616319 C1     7/1987
DE          4140366 A1     6/1993

(Continued)

*Primary Examiner* — David A Rogers
(74) *Attorney, Agent, or Firm* — The Webb Law Firm

(57) ABSTRACT

A sniffer leak detector includes a mass spectrometer for analyzing hydrogen or helium, a turbomolecular pump which is connected with said mass spectrometer and whose outlet is connected with a prevacuum pump, and a sniffer probe which includes a plurality of intake lines and is connected with said inlet of said turbomolecular pump, wherein a vacuum pump includes at least three stages whose inlet stage defines said prevacuum pump and is connected with said outlet of said turbomolecular pump via a blocked throttle, wherein, between adjacent stages of said vacuum pump, an intermediate inlet each is provided, wherein each intermediate inlet is connected with a different intake line of said sniffer probe and at least one of the intake lines as a suction line is connected with said inlet of said turbomolecular pump for obtaining different gas flows.

8 Claims, 1 Drawing Sheet

(56) References Cited

U.S. PATENT DOCUMENTS

| | | | | | |
|---|---|---|---|---|---|
| 4,779,449 | A | * | 10/1988 | Bley | G01M 3/229 73/40.7 |
| 4,785,666 | A | * | 11/1988 | Bergquist | G01M 3/202 62/55.5 |
| 4,919,599 | A | * | 4/1990 | Reich | F04D 19/046 415/90 |
| 5,107,697 | A | * | 4/1992 | Tallon | G01M 3/202 73/40.7 |
| 5,417,105 | A | * | 5/1995 | Martinez | G01M 3/205 73/40.7 |
| 5,537,857 | A | | 7/1996 | Grosse Bley | |
| 5,585,548 | A | * | 12/1996 | Grosse Bley | G01M 3/205 73/40.7 |
| 5,703,281 | A | * | 12/1997 | Myneni | G01M 3/202 73/40.7 |
| 5,733,104 | A | * | 3/1998 | Conrad | F04D 25/00 417/202 |
| 5,756,881 | A | * | 5/1998 | Stockli | G01M 3/205 73/40.7 |
| 5,900,537 | A | * | 5/1999 | Bohm | G01M 3/202 73/40.7 |
| 5,907,092 | A | | 5/1999 | Bohm | |
| 5,974,864 | A | * | 11/1999 | Bohm | G01M 3/202 73/40.7 |
| 6,021,663 | A | * | 2/2000 | Bohm | G01M 3/202 73/40.7 |
| 6,030,181 | A | * | 2/2000 | Conrad | F04B 37/14 417/251 |
| 6,415,650 | B1 | * | 7/2002 | Bohm | G01M 3/202 340/605 |
| 7,033,142 | B2 | * | 4/2006 | Conrad | F04D 19/04 417/201 |
| 7,082,813 | B2 | * | 8/2006 | Grosse-Bley | G01M 3/202 73/40.7 |
| 7,189,066 | B2 | * | 3/2007 | Liepert | F04C 23/001 418/201.1 |
| 7,204,127 | B2 | * | 4/2007 | Perkins | G01M 3/202 73/40 |
| 7,454,957 | B2 | * | 11/2008 | Lehmann | G01M 3/3281 73/40 |
| 7,500,381 | B2 | * | 3/2009 | Palenstyn | G01M 3/205 62/228.3 |
| 7,717,681 | B2 | * | 5/2010 | Bohm | G01M 3/202 417/248 |
| 7,814,922 | B2 | * | 10/2010 | Tollner | F04C 23/005 137/12 |
| 7,980,117 | B2 | * | 7/2011 | Wetzig | G01M 3/202 73/40.7 |
| 8,171,773 | B2 | * | 5/2012 | Wetzig | G01M 3/202 73/23.42 |
| 8,646,315 | B2 | * | 2/2014 | Wetzig | G01M 3/226 73/49.3 |
| 8,752,412 | B2 | * | 6/2014 | Wetzig | G01M 3/205 73/40 |
| 9,632,067 | B2 | * | 4/2017 | Wetzig | G01N 33/0009 |
| 2001/0055526 | A1 | * | 12/2001 | Kawasaki | F04D 17/168 415/90 |
| 2005/0066708 | A1 | * | 3/2005 | Grosse-Bley | G01M 3/202 73/40.7 |
| 2006/0099094 | A1 | * | 5/2006 | Schofield | F04D 27/0261 417/423.4 |
| 2006/0169028 | A1 | * | 8/2006 | Beyer | F04D 19/04 73/40.7 |
| 2008/0006080 | A1 | * | 1/2008 | Wetzig | G01M 3/205 73/40.7 |
| 2008/0053199 | A1 | * | 3/2008 | Palenstyn | G01M 3/205 73/40.7 |
| 2009/0277250 | A1 | * | 11/2009 | Wetzig | G01M 3/205 73/40.7 |
| 2010/0005861 | A1 | * | 1/2010 | Wetzig | G01M 3/202 73/40.7 |
| 2010/0294026 | A1 | | 11/2010 | Wetzig et al. | |
| 2012/0118048 | A1 | | 5/2012 | Wetzig | |
| 2013/0186183 | A1 | * | 7/2013 | Dobler | F04D 19/046 73/49.3 |
| 2014/0096595 | A1 | * | 4/2014 | Wetzig | G01M 3/226 73/40.7 |
| 2014/0123732 | A1 | * | 5/2014 | Walter | G01M 3/02 73/40 |

FOREIGN PATENT DOCUMENTS

| | | |
|---|---|---|
| DE | 4445829 A1 | 6/1996 |
| DE | 102007043382 A1 | 3/2009 |
| DE | 102009010064 A1 | 8/2010 |
| WO | 2009033978 A1 | 3/2009 |
| WO | 2010094582 A1 | 8/2010 |

\* cited by examiner

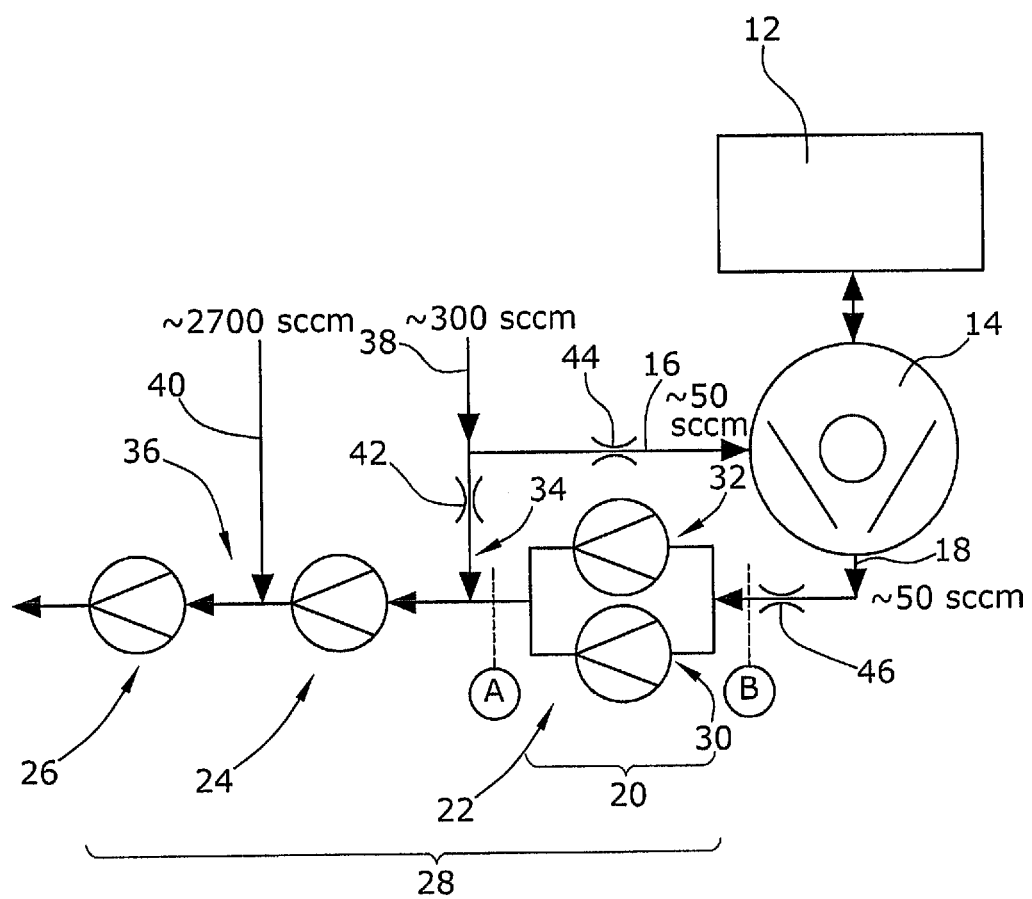

SNIFFER LEAK DETECTOR WITH MULTI-STAGE MEMBRANE PUMP

CROSS-REFERENCE TO RELATED APPLICATIONS

This application is the United States national phase of International Application No. PCT/EP2014/068582 filed Sep. 2, 2014, and claims priority to German Patent Application No. 10 2013 218 506.5 filed Sep. 16, 2013, the disclosures of which are hereby incorporated in their entirety by reference.

BACKGROUND OF TUE INVENTION

Field of the Invention

The invention relates to a sniffer leak detector having a mass spectrometer and a sniffer probe for analyzing helium or hydrogen.

Description of Related Art

Known sniffer leak detectors are used for detection of gas leaks, wherein a sniffer probe takes in the gas to be analyzed and feeds it to a detector which is capable of recognizing individual gas components in the gas taken in. Sniffer probes are known from WO 2009/033978 A1, for example. Here, a sniffer probe is described which feeds a measuring gas flow of approximately 300 sccm to a test gas sensor. If required, a gas flow of approximately 3000 sccm may be generated by adding a second intake line to increase the sensitivity of the sniffer probe at larger distances. From this gas flow the measuring gas flow of 300 sccm is branched off. The measuring gas flow is fed to a membrane permeable to a test gas.

WO 2010/094582 describes the basic principle according to which the suction line of a sniffer probe is connected with an intermediate inlet of a vacuum pump via a blocked throttle. However, this document does not reveal anything with regard to a sniffer probe including a plurality of intake lines according to the present disclosure.

In addition, mass spectrometers for analyzing helium or hydrogen are known. The mass spectrometers are connected with a turbomolecular pump whose out-let is connected with a prevacuum pump and to whose inlet the measuring gas flow is fed. For technical reasons the measuring gas flow may amount only to approximately 50 sccm. Conventionally, mass-spectrometric leak detectors are used in a vacuum since there the small measuring gas flow of 50 sccm is sufficient. For operation with a sniffer probe including a plurality of intake lines the conventional mass-spectrometric leak detectors are not suitable since the measuring gas flow of the sniffer probe of approximately 300 sccm is too large for the inlet of the turbomolecular pump and the mass spectrometer.

SUMMARY OF THE INVENTION

It is an object of the invention to provide a mass-spectrometric leak detector for sniffer leak detection having variable intake flows of the sniffer probe.

Accordingly, the mass spectrometer is connected with a sniffer probe which includes a plurality of intake lines for taking in the gas to be analyzed. The plurality of intake lines allows variable intake flows to be obtained. According to the disclosure, the sniffer leak detector is operated with a vacuum pump including at least three stages, whose inlet stage defines the prevacuum pump and whose subsequent stages serve for providing the variable selectable intake flow for the sniffer probe. The inlet stage is connected with the outlet of the turbomolecular pump via a blocked throttle to generate a stable prevacuum pressure. The blocked throttle at the outlet of the turbomolecular pump prefer-ably generates a gas flow of approximately 30-70, and in particular 50 sccm. Between the subsequent stages of the multi-stage vacuum pump respective intermediate inlets are provided which take in differently large gas flows. Each one of the intermediate inlets is connected with a different intake line of the sniffer probe. The intermediate inlet behind the inlet stage and in front of the subsequent stage generates the measuring gas flow for the measuring gas line of the sniffer probe. Preferably, this measuring gas flow amounts to approximately 200-400 sccm, and preferably approximately 300 sccm. From this measuring gas line, the line leading to the inlet of the turbomolecular pump is branched off, in which line, too, a blocked throttle may be provided to generate the required inlet flow of approximately 50 sccm (between 30 and 70 sccm) for the mass spectrometer. The next intermediate inlet generates a larger gas flow, preferably in the range between 2000 and 4000 sccm, and preferably approximately 3000 sccm. This intermediate inlet with the larger gas flow is connected with a different intake line of the sniffer probe. This intermediate inlet can optionally be connected and/or opened to generate a larger intake flow at the inlet of the sniffer probe. From this larger intake flow the smaller intake flow of approximately 300 sccm for the measuring gas line is branched off. Here, "approximately" means a variation of max. +/−10% of the stated value.

It is particularly advantageous when the vacuum pump is a four-stage vacuum pump, wherein the first two stages are connected in parallel and define the prevacuum pump for the turbomolecular pump. The larger intake capacity thus obtained is required for generation of as low as possible a pressure behind the orifice at point B to ensure blocking of the flow by this orifice.

The disclosure allows a sniffer probe having a plurality of intake lines to be used for mass-spectrometric leak detection. The multi-stage vacuum pump generates both the partial gas flows for the various intake lines of the sniffer probe and the prevacuum pressure for the turbomolecular pimp of the mass spectrometer. A separation between the prevacuum pump and the pump stages for the partial gas flows of the sniffer probe is not required since the inlet stage is connected with the turbomolecular pump via a throttle blocking the gas flow, thus generating a sufficiently stable gas pressure for the test gas detection. When the larger gas flow for the sniffer probe is connected or disconnected the gas load acting upon the turbomolecular pump does not change or shows only a negligible change. The pressure fluctuations due to connection or disconnection of the different intake lines of the sniffer probe thus do not act upon the primary pressure in the outlet line of the turbomolecular pump. It is in particular possible to generate an intake flow in the range of approximately 300 sccm or even in the range of approximately 3000 sccm at the sniffer probe using the same vacuum pump by optionally connecting or disconnecting individual intake lines, said vacuum pump defining the prevacuum pump for the mass spectrometer without the switching between the high gas flows at the sniffer probe affecting the prevacuum pressure at the mass spectrometer.

Among the plurality of intake lines of the sniffer probe one line may be configured as a measuring gas line for taking in the gas to be analyzed. This measuring gas line is then connected with the turbomolecular pump of the mass spectrometer. The remaining intake lines of the sniffer probe may then serve for varying the gas flow from which the measuring gas line withdraws the gas to be analyzed. By connecting one or more intake lines the gas flow can be increased, for example. Alternatively, it may also be possible to select one of the plurality of intake lines and connect said line as the measuring gas line with the turbomolecular pump. Then only one line each of the plurality of intake lines is operated.

BRIEF DESCRIPTION OF THE DRAWING

Hereunder an exemplary embodiment of the present disclosure is described in detail with reference to FIG. 1. FIG. 1 shows a block diagram of the exemplary embodiment.

DETAILED DESCRIPTION OF THE INVENTION

A mass spectrometer 12 is connected in a conventional manner with a turbomolecular pump 14 for a mass-spectrometric gas analysis. The turbomolecular pump 14 includes an inlet 16 and an outlet 18. At each one of the inlet 16 and the outlet 18 a gas flow of approximately 50 sccm is present.

The outlet 18 is connected with a prevacuum pump 20. The prevacuum pump 20 is defined by the inlet stage 22 of a multi-stage vacuum pump 28.

The vacuum pump 28 includes four stages, wherein the first two stages 30, 32 are connected in parallel and define the inlet stage 22. Between the inlet stage 22 and an intermediate stage 24 a first intermediate inlet 34 is defined. Between the intermediate stage 24 and the outlet stage 26 another intermediate inlet 36 is defined. Each one of the pump stages 30, 32, 24, 26 is com-posed of a membrane pump. The first intermediate inlet 34 is connected with the measuring gas line 38 of a sniffer probe. The measuring gas inlet 38 is a first intake line of the sniffer probe. Another intake line 40 of the sniffer probe is connected with the second intermediate inlet 36.

The outlet stage 26 generates a gas flow of approximately 2700 sccm at the second intermediate inlet 36 and in the second inlet line 40 of the sniffer probe. The intermediate stage 24 generates a gas flow of approximately 300 sccm at the first intermediate inlet 34 and in the measuring gas line 38 of the sniffer probe. The measuring gas line 38 is connected with the first intermediate inlet 34 via a throttle 42 blocking the gas flow to create stable pressure conditions at the split-up location of the gas flow from the measuring gas line 38. The partial flow fed to the inlet 16 of the turbomolecular pump is carried through another blocking throttle 44 to generate and keep stable the gas flow of approximately 50 sccm required for the inlet 16 of the turbomolecular pump 14 and the mass spectrometer 12.

The larger gas flow of the second intake line 40 fed through the second intermediate inlet 36 can optionally be connected at the sniffer probe to create a large intake flow of approximately 3000 sccm at the inlet of the sniffer probe. From this intake flow the measuring gas line 38 withdraws the measuring gas partial flow of approximately 300 sccm. The optional connection of the second intake line 40 at the sniffer probe increases the sensitivity of the sniffer leak detector at larger distances to the sniffer probe. The outlet 18 of the turbomolecular pump is connected with the prevacuum pump 20, i. e. with the inlet stage 22 of the vacuum pump 28, via the blocking throttle 46. With the aid of the throttle 46 a sufficiently stable gas pressure or gas flow is created at the outlet 18 of the turbomolecular pump 14, which gas pressure or gas flow is not affected by the optional connection or disconnection of the second intake line 40 at the sniffer probe.

Blocking with the aid of the throttles 42, 44, 46 means that the throttle generates a stable gas pressure which does not exceed a predetermined value irrespective of the prevailing pressure and flow conditions.

The invention claimed is:

1. A sniffer leak detector comprising:
   a mass spectrometer for analyzing hydrogen or helium,
   a turbomolecular pump which is connected with said mass spectrometer and whose outlet is connected with a prevacuum pump, and
   a sniffer probe which comprises a plurality of intake lines and is connected with an inlet of said turbomolecular pump, and
   wherein
   a vacuum pump comprising at least three stages whose inlet stage defines said prevacuum pump and is connected with said outlet of said turbomolecular pump via a blocked throttle,
   wherein, between adjacent stages of said vacuum pump, an intermediate inlet each is provided, wherein each intermediate inlet is connected with a different intake line of said sniffer probe and at least one of the intake lines as a suction line is connected with said inlet of said turbomolecular pump for obtaining different gas flows.

2. The sniffer leak detector according to claim 1, wherein the vacuum pump includes at least four stages, wherein two first stages are connected in parallel and define the prevacuum pump.

3. The sniffer leak detector according to claim 2, wherein the vacuum pump is a four-stage membrane pump whose outlet stage generates a gas flow in the range between 2000 and 4000 sccm and whose next-to-last pump stage generates a gas flow in the range between 200 and 400 sccm.

4. The sniffer leak detector according to claim 1, wherein the suction line is connected with the intermediate inlet via a blocked throttle.

5. The sniffer leak detector according to claim 1, wherein the respective pump stages are configured such that, in the intake lines, an intake flow is generated which is larger by at least a factor of 5 than a measuring gas flow branched off therefrom towards the turbomolecular pump and destined for the mass spectrometer.

6. The sniffer leak detector according to claim 1, wherein an inlet flow of the turbomolecular pump amounts to approximately 30-70 sccm.

7. The sniffer leak detector according to claim 6, wherein the inlet flow of the turbomolecular pump amounts to approximately 50 sccm.

8. The sniffer leak detector according to claim 1, wherein the suction line of the turbomolecular pump is provided with a blocked orifice which adjusts an inlet flow of said turbomolecular pump.

* * * * *